United States Patent Office 2,697,027
Patented Dec. 14, 1954

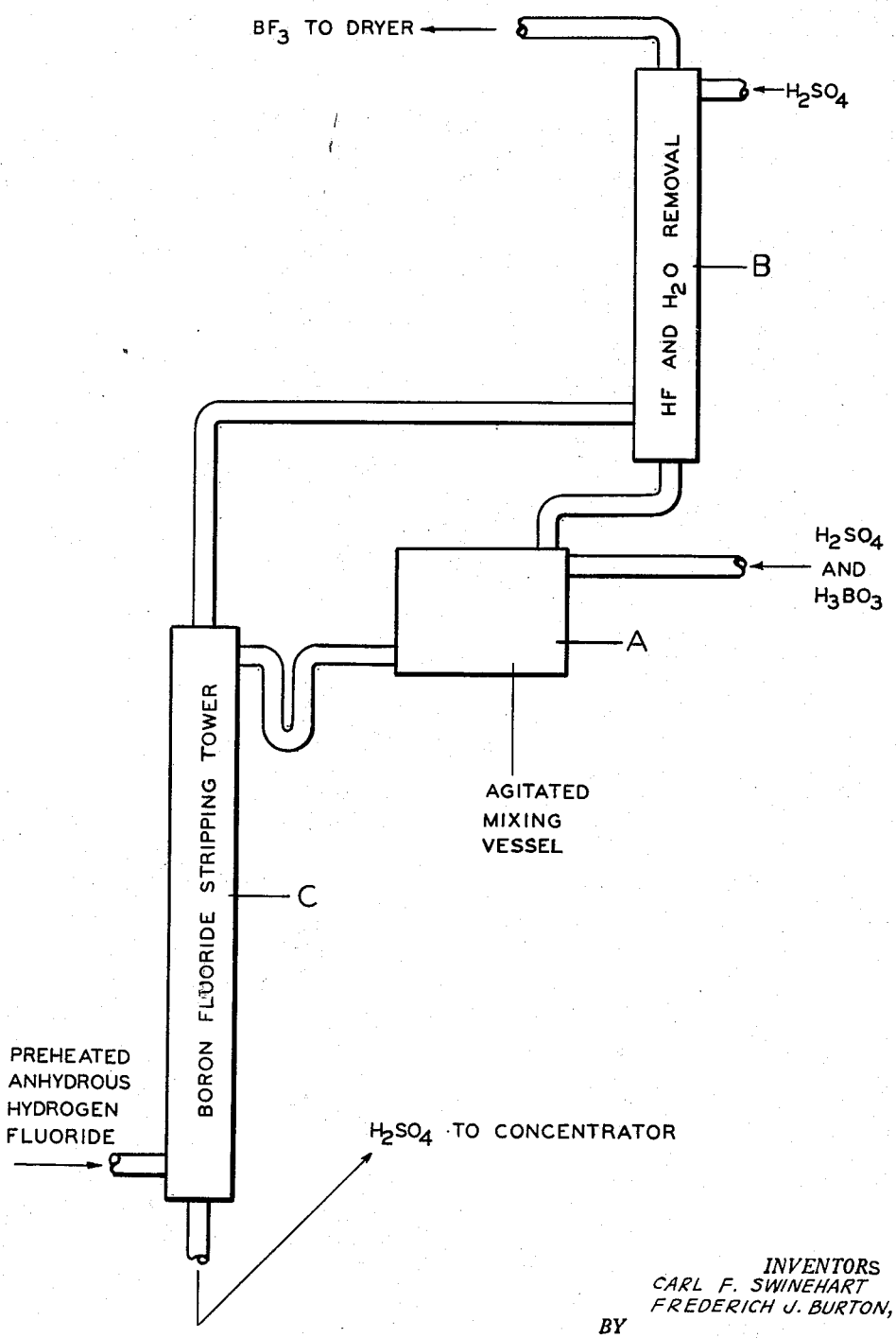

2,697,027

MANUFACTURE OF BF₃

Carl F. Swinehart, University Heights, Ohio, and Frederick J. Burton, Jr., Bay Village, Ohio, assignors to The Harshaw Chemical Company, Cleveland, Ohio, a corporation of Ohio Application February 18, 1952, Serial No. 272,092

4 Claims. (Cl. 23—205)

This invention relates to the manufacture of boron trifluoride, and more specifically to a process wherein the reacting materials are anhydrous hydrogen fluoride and boric acid or boric anhydride.

The reactions upon which the novel process is based are as follows, it being understood that any boron oxide or hydrated boron oxide can be used:

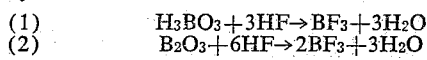

(1) $H_3BO_3 + 3HF \rightarrow BF_3 + 3H_2O$
(2) $B_2O_3 + 6HF \rightarrow 2BF_3 + 3H_2O$ It is obvious from inspection of these reactions that water is produced as well as BF₃, and it will be understood that the problem with which this invention is concerned is in removing the water produced by the reaction as well as any small free water content initially in the reacting materials. Water removal has always presented serious difficulties in the attempted production of BF₃ by any process based on the above reactions.

In experimenting with the use of H₂SO₄ for water removal in application of the above indicated process for manufacture of BF₃, very substantial corrosion problems have been encountered, since the use of elevated temperatures has been found necessary. While methods of minimizing corrosion other than the method to be described herein can be employed, the method of the present invention is thought to be of outstanding value.

The principal object of the present invention is to utilize anhydrous hydrofluoric acid as a BF₃ stripping agent, in an integrated process of the kind indicated, prior to its use in such process as a reactant in accordance with one of the above equations or similar equations. A further object is to utilize, as a BF₃ stripping agent in such a process, HF which has been preheated. The optimum amount of preheating is to a temperature as high as or somewhat above the temperature in the major reaction zone, but a lesser amount of preheating is useful. Desirably, the preheating should be at least enough to supply the heat necessary to dissociate the molecules of HF. The preheating serves to minimize or entirely obviate the necessity for external heating, and holds the temperature at or closer to the point of negligible solubility of HF and BF₃ in H₂SO₄-water compositions. Suitably the preheated HF may be at a temperature from 140° C. to 190° C.

Other and more specific objects will be in part apparent and in part pointed out hereinafter in connection with a more complete and specific description of the invention with reference to the accompanying drawings, wherein the figure is a schematic drawing of the principal units of a plant for the practice of the invention.

The apparatus utilized in practicing the embodiment of the invention, which will now be described, may be looked upon as consisting of three units: (A) a mixing vessel wherein H₂SO₄ and H₃BO₃ or the like are mixed; (B) a tower for removing water and HF from the BF₃; and (C) a BF₃ stripping tower for removing BF₃ from the liquid phase and causing it to enter the vapor phase, and wherein the reaction takes place.

As indicated in the drawings, the liquid phase enters the system at two points, one at the top of the tower B, and the other below the tower B into the mixing vessel A, the direction of flow of the liquid phase being downwardly through the tower B, from the tower B to the mixing vessel A, and from the vessel A to and downwardly through the tower C. The vapor phase moves counter-current to the liquid phase, preheated HF entering the system at the bottom of the tower C and passing upwardly therethrough and thence to and upwardly through the tower B.

Following the progress of the liquid phase H₂SO₄, relatively free of water, suitably 93%, enters the top of the packed tower B (suitably packed with carbon rings) and moves downwardly therethrough, encountering at first almost pure BF₃. As the sulfuric acid progresses downwardly, it will contact a vapor phase which is largely BF₃ but which contains increasing amounts of water and HF. These are absorbed (almost completely at first and then in decreasing degree of completeness) by the relatively dry sulfuric acid, so that the liquid phase, as it emerges at the bottom of the tower B, is substantially increased in H₂O and HF content. Below the bottom of the tower B, provision is made for injecting into the system a mixture of H₂SO₄ and boric acid, boric anhydride or other boron oxide or hydrated boron oxide. This mixture may be introduced by means of a pump, or the tube through which it is introduced may extend upwardly so that there will be sufficient head for injecting the mixture into the system. The liquid phase from the two sources now passes into the closed, agitated, mixing vessel A, where it is brought into contact with H₃BO₃ or the like and additional H₂SO₄. The mixture then passes to the top of the tower C where the reaction takes place and BF₃ and water are produced. The BF₃ will be, in large measure, transferred to the vapor phase, but a portion of it will, for a time, remain in solution in the liquid phase. The water, with the exception of a small proportion, will enter the liquid phase. The liquid phase, at first containing a considerable proportion (of the order of 10% of its weight) of BF₃, now passes downwardly through the packed tower C (suitably packed with carbon rings) where it flows countercurrent to the incoming, preheated HF. A small proportion of boric oxide in solution in the liquid phase will react with the excess of HF near the bottom of the tower C, and the BF₃ resulting as well as that which was dissolved in the liquid phase will be in large measure transferred to the vapor phase due to the sweeping action of the incoming HF which releases BF₃ from the liquid phase, and to the removal of boric oxide by reaction with the great excess of HF, which removal reduces the solubility of BF₃ in the liquid phase. It is desirable that the temperature of the reaction vessel be in the order of 100° C. to 160° C. This is very effectively accomplished by preheating the HF to that temperature range. This requires substantial heat, since HF at room temperature is associated to about $(HF)_{2.2}$. The heat of reaction generated in the tower C supplies all or most of the heat needed to elevate the temperature of the material coming into the vessel A. Loss of heat from the system may be reduced by suitable insulation. By thus reducing or eliminating external heating, the production of local high temperatures is minimized or avoided, and since local areas of high temperature are the principal causes of serious corrosion difficulties, this result is of great importance. It is not absolutely essential that the HF be preheated, and the benefits of the invention can be partially realized without preheating the HF; however, this is a very desirable feature of the invention, since it does have an important effect in the reduction of corrosion difficulties.

The principal feature of the present invention is the use of the incoming HF to release BF₃ from the liquid phase and in combination with the basic procedure of reacting HF with boric acid or boric anhydride, and then absorbing the water by means of sulfuric acid. In the example described, release of substantial quantities of BF₃ from the liquid phase is accomplished in the tower C, so that the sulfuric acid which emerges from the system shown in the drawing is much lower in BF₃ than would otherwise be the case. It will be necessary, of course, to remove a portion of the water which has been picked up on passage through the system before the sulfuric acid can be returned to the process. This may be accomplished by distillation wherein the BF₃ content and the HF content may be recovered or discarded. Under optimum conditions, these will be low enough that recovery will not be necessary.

The amount of HF to be introduced into the system theoretically should be as much as possible while still achieving the result that there will be no HF, or only a trace thereof, in $BF_3$ which emerges at the top of the tower B. However, a greater or lesser amount can be used since, if a greater amount is used than can be completely consumed or carried along in the liquid phase, it will escape with the $BF_3$ and can be removed therefrom by distillation. For some uses a mixture of HF and $BF_3$ is desirable. If the amount of HF is less than the total which can be consumed, the result may be that boric acid or boric anhydride will remain in the liquid phase emerging from the tower C. Such boric oxide content would be recirculated with the sulfuric acid and later consumed in the reaction. It will be understood, however, that the optimum amount of HF is just that amount which can be completely consumed in the production of $BF_3$ and dissolved in the liquid phase so that no HF escapes with the product. Variations from this optimum can be tolerated if they are not too great but any great deviation cannot be considered desirable. In practice, a deficiency in HF below the maximum which can be consumed and held in the liquid phase may be desirable as a safety measure to prevent the possibility of going above the optimum and causing substantial HF content in the $BF_3$ produced.

In practice, it may be found desirable to pass the $BF_3$ issuing from the tower B over, e. g., concentrated sulfuric acid in order to remove the last traces of moisture and HF, if any.

By way of example, in the operation of one embodiment of the invention the composition of the liquid phase at the top of the tower B may be 93% $H_2SO_4$, remainder substantially water with very small traces of HF and $BF_3$, and at the top of the tower C it may be 83.5% $H_2SO_4$, 6.4% water, 0.2% HF and 10% of $H_3BO_3$. At the same time the vapor phase at the top of the tower B may be about 100% $BF_3$ with trace amounts of $H_2O$ and HF, and the vapor phase at the top of the tower C may be 96.3% $BF_3$, 1.9% HF and 0.5% water. The composition of the liquid phase at the bottom of the tower C may be about 83% $H_2SO_4$, 1.9% HF, 0.6% $BF_3$ and 14.7% $H_2O$.

Having thus described our invention, what we claim is:

1. A process for production of boron trifluoride including the steps of reacting hydrogen fluoride with a compound of the class consisting of boric acid, boron oxides, and hydrated boron oxides, contacting the reaction mixture with sulfuric acid, passing the resulting vapor phase into contact with sulfuric acid of lower water concentration than the reaction mixture, passing the resulting liquid phase into contact with gaseous hydrogen fluoride, and bringing together the said last mentioned sulfuric acid with its content of material extracted from said vapor phase, said last mentioned hydrogen fluoride with its content of material extracted from said liquid phase and additional boron compound of said claims.

2. A process for production of anhydrous boron trifluoride comprising continuously reacting in a reaction zone a compound of the class consisting of boric acid, boron oxides and hydrated boron oxides with hydrogen fluoride in the presence of sulfuric acid, passing the resulting vapor phase from said reaction zone counter-current to a further quantity of sulfuric acid in liquid state moving into said reaction zone and continuously passing the resulting liquid phase from said reaction zone counter-current to a further quantity of hydrogen fluoride in vapor phase moving into said reaction zone and thereafter removing water from said liquid phase and returning said liquid phase to the process.

3. A process for production of anhydrous boron trifluoride comprising continuously reacting in a reaction zone a compound of the class consisting of boric acid, boron oxides and hydrated boron oxides with hydrogen fluoride in the presence of sulfuric acid, passing the resulting vapor phase from said reaction zone counter-current to a further quantity of sulfuric acid in liquid state moving into said reaction zone, continuously introducing a mixture of sulfuric acid and said compound into said reaction zone and continuously passing the liquid phase from said reaction zone counter-current to a further quantity of hydrogen fluoride in vapor phase moving into said reaction zone and thereafter removing water from said liquid phase and returning said liquid phase to the process.

4. The invention according to claim 1 wherein said gaseous hydrogen fluoride is preheated to a temperature in the range from 140° C. to 190° C.

References Cited in the file of this patent

UNITED STATES PATENTS

| Number | Name | Date |
|---|---|---|
| 2,148,514 | Swinehart | Feb. 28, 1939 |
| 2,374,957 | Rummelsburg | May 1, 1945 |
| 2,416,133 | Young et al. | Feb. 18, 1947 |

FOREIGN PATENTS

| Number | Country | Date |
|---|---|---|
| 478,085 | Great Britain | Jan. 12, 1938 |